United States Patent
Masuda et al.

(10) Patent No.: US 9,676,376 B2
(45) Date of Patent: Jun. 13, 2017

(54) VEHICLE BRAKE FLUID PRESSURE CONTROL APPARATUS

(75) Inventors: Naoki Masuda, Nagano (JP); Nobuyuki Nomura, Nagano (JP)

(73) Assignee: AUTOLIV NISSIN BRAKE SYSTEMS JAPAN CO., LTD., Nagano (JP)

(*) Notice: Subject to any disclaimer, the term of this patent is extended or adjusted under 35 U.S.C. 154(b) by 1749 days.

(21) Appl. No.: 12/949,253

(22) Filed: Nov. 18, 2010

(65) Prior Publication Data

US 2011/0125379 A1 May 26, 2011

(30) Foreign Application Priority Data

Nov. 20, 2009 (JP) ................... 2009-264566

(51) Int. Cl.
*B60T 7/00* (2006.01)
*B60T 7/22* (2006.01)
*B60T 7/04* (2006.01)
*B60T 7/12* (2006.01)

(52) U.S. Cl.
CPC ............... *B60T 7/22* (2013.01); *B60T 7/042* (2013.01); *B60T 7/122* (2013.01); *B60T 2201/06* (2013.01)

(58) Field of Classification Search
CPC . B60T 7/042; B60T 7/122; B60T 7/22; B60T 2201/06
USPC ................ 303/114.1, 119.1, 155; 701/70, 71
See application file for complete search history.

(56) References Cited

U.S. PATENT DOCUMENTS

| 4,728,155 A * | 3/1988 | Resch | B60T 8/4004 303/10 |
|---|---|---|---|
| 2002/0069010 A1* | 6/2002 | Nishira | B60K 31/0008 701/96 |
| 2004/0135427 A1* | 7/2004 | Inagaki | B60T 8/36 303/119.1 |
| 2005/0137775 A1* | 6/2005 | Sekiguchi | B60W 10/06 701/96 |
| 2005/0182551 A1* | 8/2005 | Sugano | B60K 31/0008 701/96 |

FOREIGN PATENT DOCUMENTS

JP 2001260840 9/2001

* cited by examiner

*Primary Examiner* — Stephen Holwerda
(74) *Attorney, Agent, or Firm* — Andrew M. Calderon; Roberts Mlotkowski Safran Cole & Calderon, P.C.

(57) ABSTRACT

A vehicle brake fluid pressure control apparatus includes a control unit including a memory part for storing a valve closing map which shows a relationship between a differential pressure between an upstream side and a downstream side of a pressure regulator valve and an output current value for closing the pressure regulator valve and a valve opening map which shows a relationship between the differential pressure and an output current value for opening the pressure regulator valve. The control unit executes a current value switching control in which the output current value of the valve closing map is changed to that of the valve opening map and thereafter, the output current of the valve opening map is changed to an output current value which lies somewhere between the output current values of the valve closing map and the valve opening map.

15 Claims, 7 Drawing Sheets

VEHICLE BRAKE FLUID PRESSURE CONTROL APPARATUS

BACKGROUND

1. Field of the Invention

The present invention relates to a vehicle brake fluid pressure control apparatus which includes as a pressure regulator valve a normally open electromagnetic valve which can change arbitrarily a valve closing force (a valve opening force) in accordance with the amount of energization.

2. Description of the Related Art

Conventionally, there have been known vehicle brake fluid pressure control apparatuses which include pumps for pressurizing fluid in wheel brakes so as to increase brake fluid pressures therein and pressure regulator valves for regulating the brake fluid pressures in the wheel brakes (refer to JP-A-2001-260840, for example). In this technique, used as the pressure regulator valve is a proportional electromagnetic valve (liner solenoid valve) which generates a valve closing force which is proportional to the magnitude of an electric current given. With this proportional electromagnetic valve, a differential pressure between an upstream side and a downstream side of the pressure regulator valve can be changed in proportion to a change in valve closing force (that is, a change in the magnitude of electric current).

An electric current given to the pressure regulator valve is controlled based on a map stored in advance, whereby the brake fluid pressures in the wheel brakes can be controlled well.

Incidentally, in such proportional electromagnetic valves, there may be a proportional electromagnetic valve in which depending on the construction thereof, an output current value for opening the valve from a closed state differs from an output current value for closing the valve from an open state (a valve closing property differs from a valve opening property). In the event that the valve opening output current value differs from the valve closing output current value, two different maps, a valve closing map and a valve opening map, are prepared as maps so that the current control is performed by referring to only the valve closing map when performing a valve closing control, while when performing a valve opening control, the current control is performed by referring to only the valve opening map.

In the event that the valve closing property differs largely from the valve opening property, however, in opening the valve from the closed state, there has been a fear that an actual fluid pressure reduction amount becomes larger than a target value or a fluid pressure reduction gradient deviates from a target fluid pressure reduction gradient only by switching the maps directly from the valve closing map to the valve opening map for reference.

SUMMARY

An object of the invention is to provide a vehicle brake fluid pressure control apparatus which can realize a good brake fluid pressure reduction even though the valve closing property differs largely from the valve opening property.

According to an aspect of the invention there is provided a vehicle brake fluid pressure control apparatus including: a pump configured to pressurize a brake fluid so as to increase a fluid pressure within a wheel brake; a pressure regulator valve configured to adjust the fluid pressure within the wheel brake which is a normally open electromagnetic valve which is configure to adjust a differential pressure between an upstream side and a downstream side thereof in accordance with a current value; and a control unit configured to control a current which is caused to flow to the pressure regulator valve, the control unit including a memory part configured to store a valve closing map which shows a relationship between the differential pressure between the upstream side and the downstream side of the pressure regulator valve and an output current value for closing the pressure regulator valve and a valve opening map which shows a relationship between the differential pressure and an output current value for opening the pressure regulator valve, wherein when attempting to reduce the fluid pressures within the wheel brakes by opening the pressure regulator valve, the control unit executes a current value switching control in which a current that flows to the pressure regulator valve is controlled so that the output current value of the valve closing map is changed to the output current value of the valve opening map and thereafter, the output current of the valve opening map is changed to an output current value which lies somewhere between the output current value of the valve closing map and the output current value of the valve opening map.

According to the invention, when reducing the brake fluid pressurized by an input from a brake pedal so as to increase the fluid pressures within the wheel brakes by opening the pressure regulator valve, since the valve opening amount is reduced after the opening of the pressure regulator valve is ensured by changing the output current value of the valve opening map to the output current value lying somewhere between the output current value of the valve closing map and the output current value of the valve opening map after the output current value of the valve closing map has been changed to the output current value of the valve opening map, the fluid pressures within the wheel brakes can be reduced gradually. Because of this, even though the valve closing property and the valve opening property of the pressure regulator valve differ largely from each other, a good fluid pressure reduction can be realized, thereby making it possible to minimize the influences by the property difference resulting from the construction and setting of assemblage of the pressure regulator valve.

The current value switching control may be executed when attempting to reduce the fluid pressures of the wheel brakes which were increased before the start of the vehicle or are held as they were at the time of start of the vehicle. Namely, in the case of the current value switching control according to the invention, the fluid pressures of the wheel brakes can be reduced gradually by controlling the output current values between the maps while maintaining the open state of the pressure regulator valve once it has been opened. Therefore, the pressure regulator valve does not have to be opened and closed a plurality of times, and the fluid pressures can be reduced quietly. Because of this, even when the engine revolution speed is relatively low as when the vehicle is about to start, the pulsation or operation noise which would be caused by the pressure regulator valve being opened or closed can be suppressed, thereby making it possible to prevent the driver from being caused to feel an uncomfortable sensation.

According to the invention, even though the valve closing property and the valve opening property of the pressure regulator valve differ largely from each other, a good brake fluid pressure reduction can be realized.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Next, an embodiment of the invention will be described in detail by referring to the drawings as required.

Figure 1:
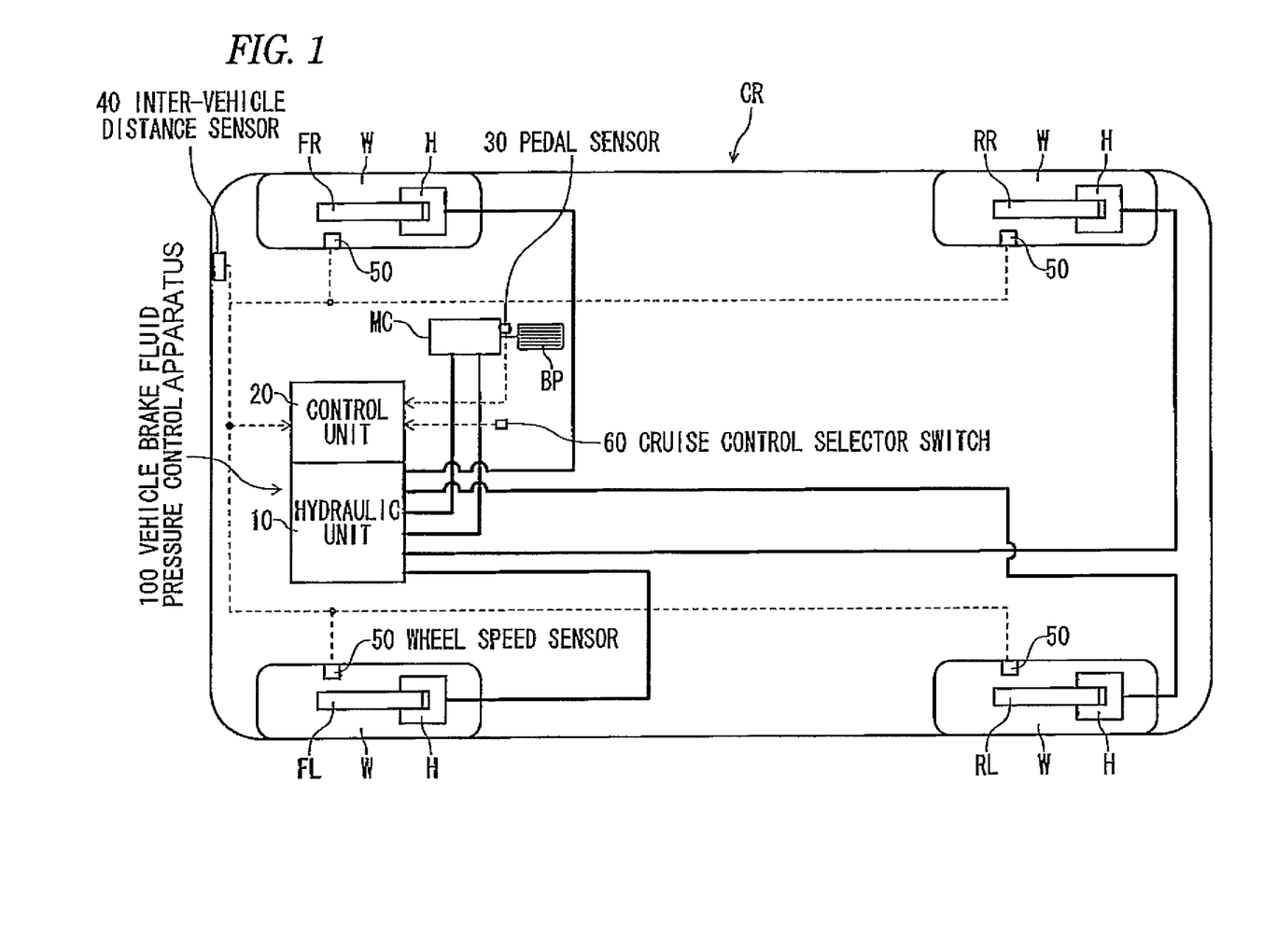
FIG. 1 is a block diagram of a vehicle provided with a vehicle brake fluid pressure control apparatus according to an embodiment of the invention.

As is shown in FIG. 1, a vehicle brake fluid pressure control apparatus 100 is such as to control braking forces (brake fluid pressures) given to road wheels W of a vehicle CR as required and mainly includes a hydraulic unit 10 in which fluid lines (fluid pressure lines) and constituent parts are provided and a control unit 20 for controlling the constituent parts within the hydraulic unit 10 as required. Connected to the control unit 20 of the vehicle brake fluid pressure control apparatus 100 are a pedal sensor 30, an inter-vehicle distance sensor 40, wheel speed sensors 50 and an automatic speed control or cruise control selector switch 60, so that signals from the respective sensors 30 to 50 and the cruise control selector switch are inputted thereinto.

The pedal sensor 30 is a sensor for detecting whether or not a brake pedal BP is pressed down and is provided in the vicinity of the brake pedal BP.

The inter-vehicle distance sensor 40 is a sensor for detecting a distance to an object (a vehicle or the like) which lies ahead of the vehicle Cr (hereinafter, referred to as an inter-vehicle distance) and is provided at a front side of a vehicle body.

The wheel speed sensors 50 are sensors for detecting wheel speeds of the road wheels W and are provided at the respective road wheels W.

The cruise control selector switch 60 is a switch for selecting an automatic speed control or cruise control with a known automatic braking function (a control in which the vehicle CR is allowed to run at a set speed without approaching a preceding vehicle closer than a predetermined inter-vehicle distance) and is provided at an appropriate location near a driver's seat.

The control unit 20 includes, for example, a CPU, a RAM, a ROM and an input/output circuit and executes a control by performing arithmetic operations based on inputs from the pedal sensor 30, the inter-vehicle distance sensor 40, the wheel speed sensors 50 and the cruise control selection switch 60, as well as programs and data which are stored in the ROM.

Wheel cylinders H are hydraulic devices for converting brake hydraulic or fluid pressures generated by a master cylinder MC and the vehicle brake fluid pressure control apparatus 100 into working forces of wheel brakes FR, FL, RR, RL which are provided individually in the road wheels W and are connected individually to the hydraulic unit 10 of the vehicle brake fluid pressure control apparatus 100 via lines.

Figure 2:
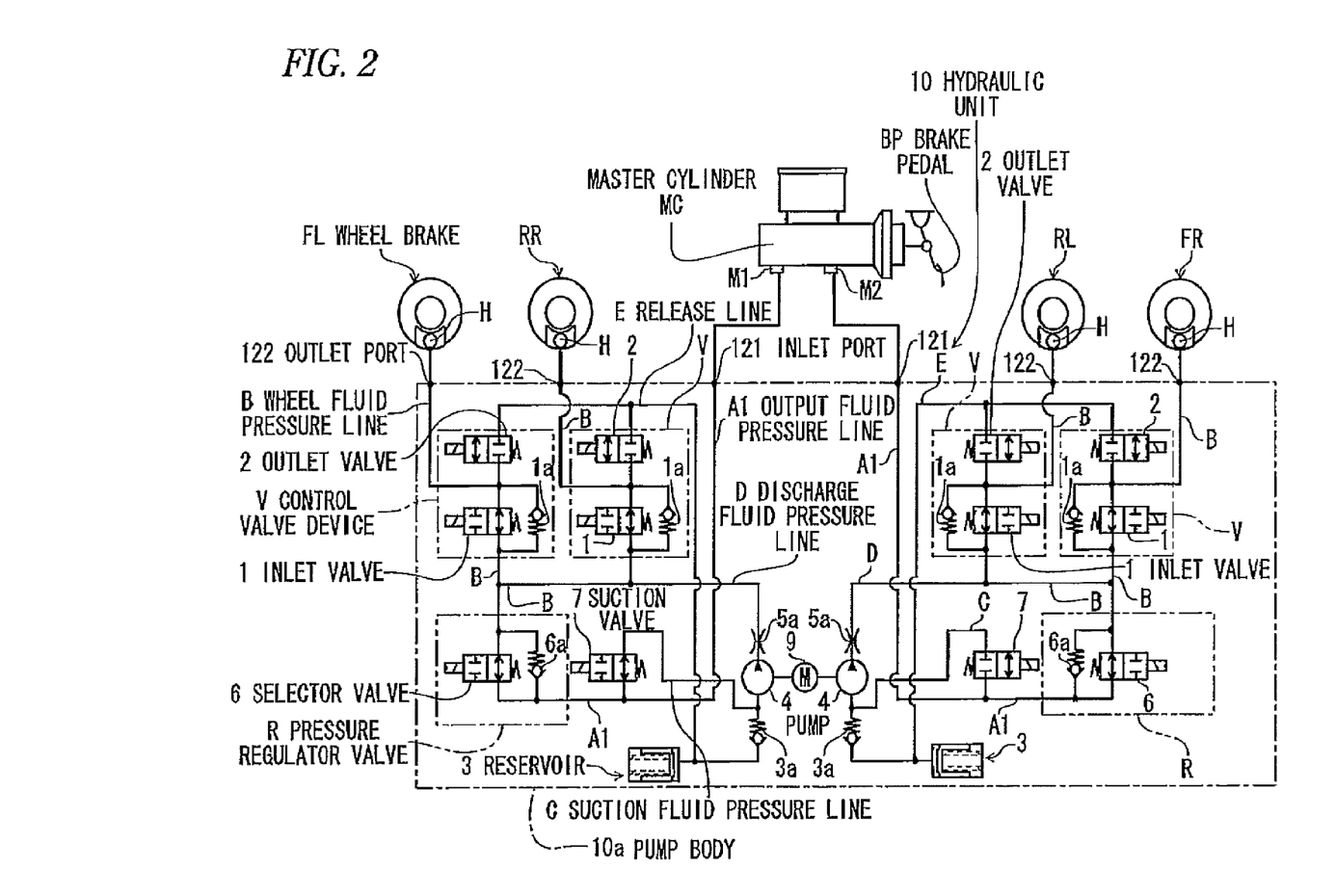
FIG. 2 is a brake fluid pressure circuit diagram of the vehicle brake fluid pressure control apparatus.

As is shown in FIG. 2, the hydraulic unit 10 of the vehicle brake fluid pressure control apparatus 100 is disposed between the master cylinder MC which is a hydraulic pressure source for generating a brake hydraulic or fluid pressure in accordance with pedal effort applied to the brake pedal BP by the driver and the respective wheel brakes FR, FL, RR, RL. The hydraulic unit 10 includes a pump body 10a which is a base member having fluid lines through which a brake fluid flows and pluralities of inlet valves 1 and outlet valves 2 which are provided on the fluid lines. Two output ports M1, M2 of the master cylinder MC are connected to inlet ports 121, respectively, of the pump body 10a, and outlet ports 122 of the pump body 10a are connected to the corresponding wheel brakes FR, FL, RR, RL. Normally, fluid lines are formed which communicate from the inlet ports 121 to the outlet ports 122 of the pump body 10a, whereby pedal effort applied to the brake pedal BP is allowed to be transmitted individually to the wheel brakes FL, RR, RL, FR.

Here, a fluid line starting from the output port M1 communicates with the wheel brake FL of the front left road wheel and the wheel brake RR of the rear right road wheel. A fluid line starting from the output port M2 communicates with the wheel brake FR of the front right road wheel and the wheel brake RL of the rear left road wheel. Hereinafter, the fluid line starting from the output port M1 is referred to as a "first circuit" and the fluid line starting from the output port M2 as a "second circuit."

In the hydraulic unit 10, two control valve devices V are provided in the first circuit so as to correspond to the wheel brakes FL, RR, respectively. Similarly, two control valve devices V are provided in the second circuit so as to correspond to the wheel brakes RL, FR, respectively. Additionally, in the hydraulic unit 10, a reservoir 3, a pump 4, an orifice 5a, a pressure regulator valve (a regulator) R and an inlet valve 7 are provided for each of the first circuit and the second circuit. In the hydraulic unit 10, a common motor 9 is provided for driving the pump 4 of the first circuit and the pump 4 of the second circuit. This motor 9 is a motor whose revolution speed can be controlled, and in this embodiment, the revolution speed of the motor 9 is controlled through a duty control.

Hereinafter, fluid lines extending individually from the output ports M1, M2 of the master cylinder MC to the individual pressure regulator valves R are referred to as an "output fluid pressure line A1." Fluid lines extending from the pressure regulator valve R of the first circuit to the wheel brakes FL, RR and fluid lines extending from the pressure regulator valve R of the second circuit to the wheel brakes RL, FR are referred to individually as a "wheel fluid pressure line B." A fluid line extending from the output fluid pressure line A1 to the pump 4 and the reservoir 3 is referred to as a "suction fluid pressure line C." A fluid line extending from the pump 4 to the wheel fluid pressure line B is referred to as a "discharge fluid pressure line D." A fluid line extending from the wheel fluid pressure line B to the inlet fluid pressure line C is referred to as a "release line E."

The control valve devices V are valves for controlling the communication of fluid pressures from the master cylinder MC or the pumps 4 to the wheel brakes FL, RR, RL, FR (to be precise, the wheel cylinders H) or vice versa and can increase, hold or reduce the pressures in the wheel cylinders H. Because of this, the control valve devices V each include an inlet valve 1, an outlet valve 2 and a check valve 1a.

The inlet valves 1 are normally open proportional electromagnetic valves which are provided individually between the wheel brakes FL, RR, RL, FR and the master cylinder MC, that is, on the wheel fluid pressure lines B. Because of this, a differential pressure between an upstream side and a downstream side of the inlet valve 1 can be adjusted in accordance with the value of a drive current (the value of an output current) which flows to the inlet valve 1.

The outlet valves 2 are normally closed electromagnetic valves which are interposed individually between the wheel brakes FL, RR, RL, FL and the corresponding reservoirs 3, that is, between the wheel fluid pressure lines B and the corresponding release lines E. The outlet valves 2 are normally closed but are opened by the control unit 20 when the wheels are about to lock up, whereby brake fluid pressures that are to be applied individually to the wheel brakes FL, FR, RL, RR are allowed to be released to the corresponding reservoirs 3.

The check valves 1a are individually connected in parallel to the corresponding inlet valves 1. These check valves 1a are valves which permit only flows of brake fluid from the wheel brakes FL, FR, RL, RR side into the master cylinder MC side. In the event that an input from the brake pedal BP is cancelled, the check valves 1a permit flows of brake fluid from the wheel brakes FL, FR, RL, RR side into the master cylinder MC side even in such a state that the inlet valves 1 are closed.

The reservoirs 3 are provided on the release lines E and function to store brake fluid pressures which are released by the individual outlet valves 2 being opened. Check valves 3a are interposed between the reservoirs 3 and the pumps 4 for permitting only flows of brake fluid from the reservoirs 3 side to the pumps 4 side.

The pumps 4 are interposed individually between the suction fluid pressure lines C which communicate with the output fluid pressure lines A1 and the discharge fluid pressure lines D which communicate with the wheel fluid pressure lines B and function to suck the brake fluid stored in the reservoirs 3 so as to discharge it into the discharge fluid pressure lines D. By providing the pumps 4 in the way described above, the brake fluid sucked into the reservoirs 3 can be returned to the master cylinder MC, and as will be described later, braking forces can be generated in the wheel brakes FL, RR, RL, FL.

The amount of brake fluid discharged by the pump 4 depends on the revolution speed (the duty ratio) of the motor 9. Namely, the amount of brake fluid discharged by the pump 4 increases as the revolution speed (the duty ratio) of the motor 9 increases.

The orifices 5a attenuate the pulsation of brake fluid discharged from the pumps 4 under pressure.

The pressure regulator valve R functions to permit a flow of brake fluid from the output fluid pressure line A1 to the wheel fluid pressure lines B when in a normal state, while when the pressure on the wheel cylinders H side is increased by a brake fluid pressure generated by the pump 4, the pressure regulator valve R functions to control the pressure on the wheel cylinders H side to be a set value or smaller while cutting off the flow of brake fluid. The pressure regulator valves R each include a selector valve 6 and a check valve 6a.

The selector valves 6 are normally open proportional electromagnetic valves, which are interposed between the output fluid pressure lines A1 which communicate with the master cylinder MC and the wheel fluid pressure lines B which communicate individually the wheel brakes FL, FR, RL, RR. Because of this, a differential pressure between an upstream side and a downstream side of the selector valve 6 is adjusted by changing arbitrarily a valve closing force in accordance with the value of a drive current (the value of an output current) which is caused to flow to the selector valve, whereby the pressures of the wheel fluid pressure lines B can be adjusted to a set value or smaller.

The check valves 6a are individually connected in parallel to the selector valves 6. The check valves 6 are one-way valves which permit a flow of brake fluid from the output fluid pressure lines A1 to the wheel fluid pressure lines B.

Suction valves 7 are normally closed electromagnetic valves, which are provided on the suction fluid pressure lines C for switching between a state in which the suction fluid pressure lines C are opened and a state in which the same fluid pressure lines are cut off. The suction valves 7 are controlled to be opened by the control unit 20, for example, when the fluid pressures in the wheel brakes FL, FR, RL, RR are increased by the pumps 4.

Next, the control unit 20 will be described in detail.

Figure 3:
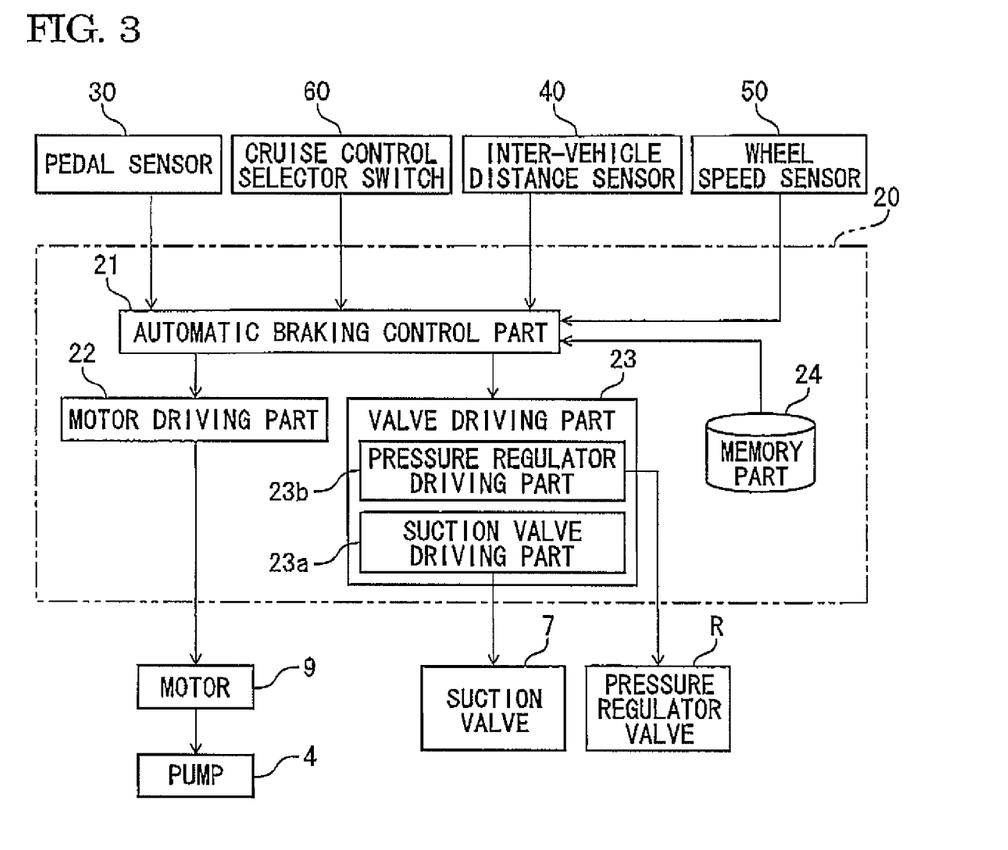
FIG. 3 is a block diagram showing the configuration of a control unit.

As is shown in FIG. 3, the control unit 20 controls the opening and closing operations of the pressure regulator valves R (the selector valves 6) and the suction valves and the operation of the motor 9 within the hydraulic unit 10 based on signals inputted thereinto from the pedal sensor 30, the inter-vehicle distance sensor 40, the wheel speed sensors 50 and the cruise control selector switch 60, so as to control the operation of the wheel brakes FL, RR, RL, FR. In addition to this, the control unit 20 is designed to execute not only a known ABS control but also an automatic braking during a cruise control which is an example of an automatic pressurizing control by the pumps 4.

In this embodiment, the description of the known ABS control and the known automatic driving control (the throttle control) during a cruise control will be omitted, and only the automatic braking (the brake fluid pressure control) during the cruise control according to the invention will be described.

The control unit 20 is made up of an automatic braking control part 21, a motor driving part 22, a valve driving part 23 and a memory part 24.

The automatic braking control part 21 is designed to execute a known automatic pressurizing control in which the brake fluid is pressurized by the pumps 4 to increase the fluid pressures in the wheel brakes when the inter-vehicle distance between the preceding vehicle and the subject vehicle becomes a predetermined value or smaller. In addition, the automatic braking control part 21 is designed to execute an automatic reducing control according to the invention after the automatic pressurizing control ends.

Specifically speaking, the automatic braking control part 21 executes the automatic braking control on condition that no signal is received from the pedal sensor 30 and the cruise control selector switch 60 is on (a predetermined condition is met).

In the automatic braking control, the automatic braking control part 21 calculates an inter-vehicle distance based on signals which are outputted from the inter-vehicle distance sensor 40 and determines whether or not the inter-vehicle distance becomes a predetermined value (a primary target L1, which will be described later) or smaller at all times. This predetermined value changes in accordance with vehicle body speed as is generally known. Specifically speaking, for example, a map showing a relationship between vehicle body speed and a target value of the inter-vehicle distance is stored in the memory part 24 in advance, and a target value (a predetermined value) of the inter-vehicle distance is calculated based on the map and a vehicle body speed calculated from signals sent from the wheel speed sensors 50.

When the inter-vehicle distance becomes the predetermined value or smaller, the automatic braking control part 21 controls the pumps 4 to pressurize the brake fluid to increase the fluid pressures within the wheel brakes (the wheel cylinders) so as to allow the subject vehicle to be spaced farther away from the preceding vehicle. Because of this, the automatic braking control unit 21 outputs a signal to actuate the motor to the motor driving part 22 and a signal to open the suction valves 7 to a suction valve driving part 23a and indicates an output current value to a pressure regulator valve driving part 23b. This output current value is a current value corresponding to a differential pressure between an upstream side (a master cylinder MC side) and a downstream side (a wheel cylinder H side) of the pressure regulator valve R and is calculated based on a valve opening map MP1 and a valve closing map MP2 which are stored in the memory part 24.

Figure 4:
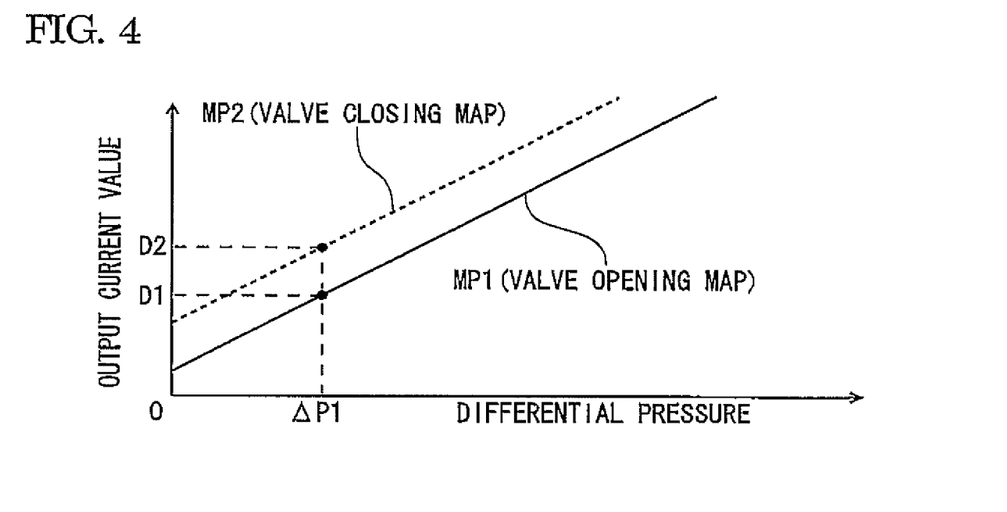
FIG. 4 is a graph showing a valve opening map and a valve closing map.

As is shown in FIG. 4, the valve opening map MP1 is a map which shows a relationship between a differential pressure between the upstream side and the downstream side of the pressure regulator valve R and an output current value for opening the valves. The valve closing map MP2 is a map which shows a relationship between a differential pressure between the upstream side and the downstream side of the pressure regulator valve R and an output current value for closing the valves. In the maps MP1, MP2, for the same differential pressure (for example, $\nabla$P1), an output current value (D2) which is calculated based on the valve closing map MP2 is made to take a larger value than an output current value (D1) calculated based on the valve opening map MP1. Namely, in the pressure regulator valves R of this embodiment, a valve closing property and a valve opening property differ largely from each other depending on the construction and setting of assemblage thereof.

In carrying out the automatic pressurizing control, the automatic braking control part 21 calculates an output current value only by use of the valve closing map MP2 so as to close the pressure regulator valves R which are kept open then.

When the inter-vehicle distance is restored to a sufficient level as a result of the automatic pressurizing control having been carried out (when the inter-vehicle distance becomes larger than a secondary target value L2, which will be described later), the automatic braking control part 21 ends the automatic pressurizing control and executes the automatic reducing control. Specifically, as is shown in FIG. 3, the automatic braking control part 21 stops the output of a signal to the motor driving part 22 so as to stop the pumps 4 and outputs a signal to close the suction valves 7 to the suction valve driving part 23a and indicates an output current value to the pressure regulator valve driving part 23b.

When reducing the pressurized brake fluid to reduce the fluid pressures within the wheel brakes which have been increased by the pumps 4 in the way described above by opening the pressure regulator valves R, the automatic braking control part 21 executes a current value switching control (refer to FIG. 6(c)) in which an output current value of the valve closing map MP2 is changed to an output current value of the valve opening map MP1 and thereafter, the output current value of the valve opening map MP1 is changed to a current output value lying somewhere between the output current value of the valve closing map MP2 and the output current value of the valve opening map MP1 (hereinafter, also referred to as an intermediate current value). The intermediate current value may be any value which lies between the output current value of the valve closing map MP2 and the output current value of the valve opening map MP1. The intermediate current value may be set to any preferable value as required by types of vehicles.

As is shown in FIG. 3, the motor driving part 22 determines a revolution speed of the motor 9 based on the indication from the automatic braking control part 21 and drives the motor 9 at the revolution speed so determined. Namely, the motor driving part 22 drives the motor 9 through revolution speed control, and in this embodiment, the motor driving part 22 executes the revolution speed control through a duty control.

The valve driving part 23 is a part for controlling the pressure regulator valves R and the suction valves 7 based on the indication given by the automatic braking control part 21. Because of this, the valve driving part 23 has a suction valve driving part 23a and a pressure regulator valve driving part 23b.

No current is caused to flow to the suction valves 7 by the suction valve driving part 23a at normal time. Then, when an indication of output current value is given by the automatic braking control part 21, the suction valve driving part 23a outputs signals to the suction valves 7 according to the indication given. By doing this, the suction valves 7 are opened, whereby brake fluid is sucked into the pumps 4 from the master cylinder MC.

No current is caused to flow to the pressure regulator valves R by the pressure regulator valve driving part 23b at normal times. Then, when an indication of output current value is given by the automatic braking control part 21, the pressure regulator valve driving part 23b supplies a driving current to the pressure regulator valves R according to the indication given. When the driving current is supplied to the pressure regulator valves R, a differential pressure corresponding to the driving current given can be formed between an upstream side and a downstream side of each of the pressure regulator valves R. In case a differential pressure larger than the one corresponding to the driving current is generated, the pressure regulator valves R are opened so as to maintain the differential pressure corresponding to the driving current. As a result, the fluid pressures within the wheel brakes are adjusted.

Next, referring to FIG. 5, the operation of the control unit 20 will be described.

Figure 5:
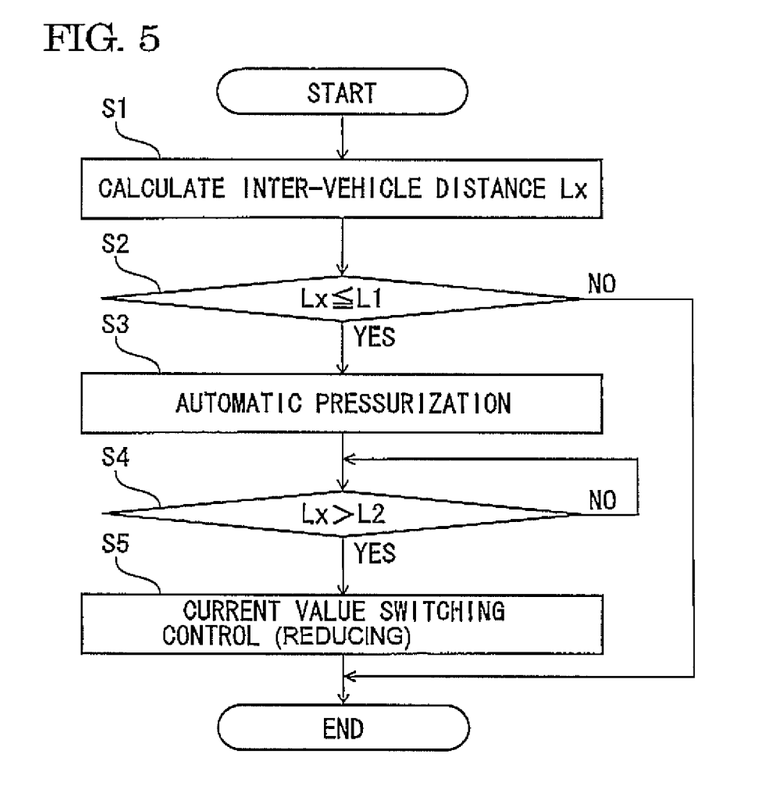
FIG. 5 is a flowchart showing an operation of the control unit.

As is shown in FIG. 5, the control unit 20 starts the automatic braking control on condition that no signal is received from the pedal sensor 30 (no input to the brake pedal) and the cruise control switch 60 is ON (START). The control unit 20 repeats a series of operations from start to end until the predetermined conditions are met (for example, the cruise control switch 60 is switched off or an signal is outputted from the pedal sensor 30).

The control unit 20 calculates an inter-vehicle distance Lx based on a signal outputted from the inter-vehicle distance sensor 40 (S1). After step S1, the control unit 20 determines whether or not the calculated inter-vehicle distance Lx becomes the primary target value L1 (the predetermined value) or smaller (S2). In step S1, if the inter-vehicle distance Lx is larger than the primary target value L1, (No), stopping this control temporarily (END), the control unit 20 returns to START.

In step S2, if the control unit 20 determines that the inter-vehicle distance Lx becomes the primary target value of smaller (Yes), the control unit 20 executes the known automatic pressurizing control as has been described above (S3). After step S3, the control unit 20 determines whether or not the inter-vehicle distance Lx becomes larger than the secondary target value L2 (S4). Here, as the secondary target value L2, a value which is larger than the primary target value L1 or a value equal thereto can be adopted.

In step S4, if the inter-vehicle distance Lx is equal to or smaller than the secondary target value L2 (No), the control unit 20 repeats the operation in step S4 again. Then, in step 34, if the inter-vehicle distance Lx becomes larger than the secondary target value L2 (Yes), the control unit 20 executes the current value switching control as has been described above (S5).

Figure 6:
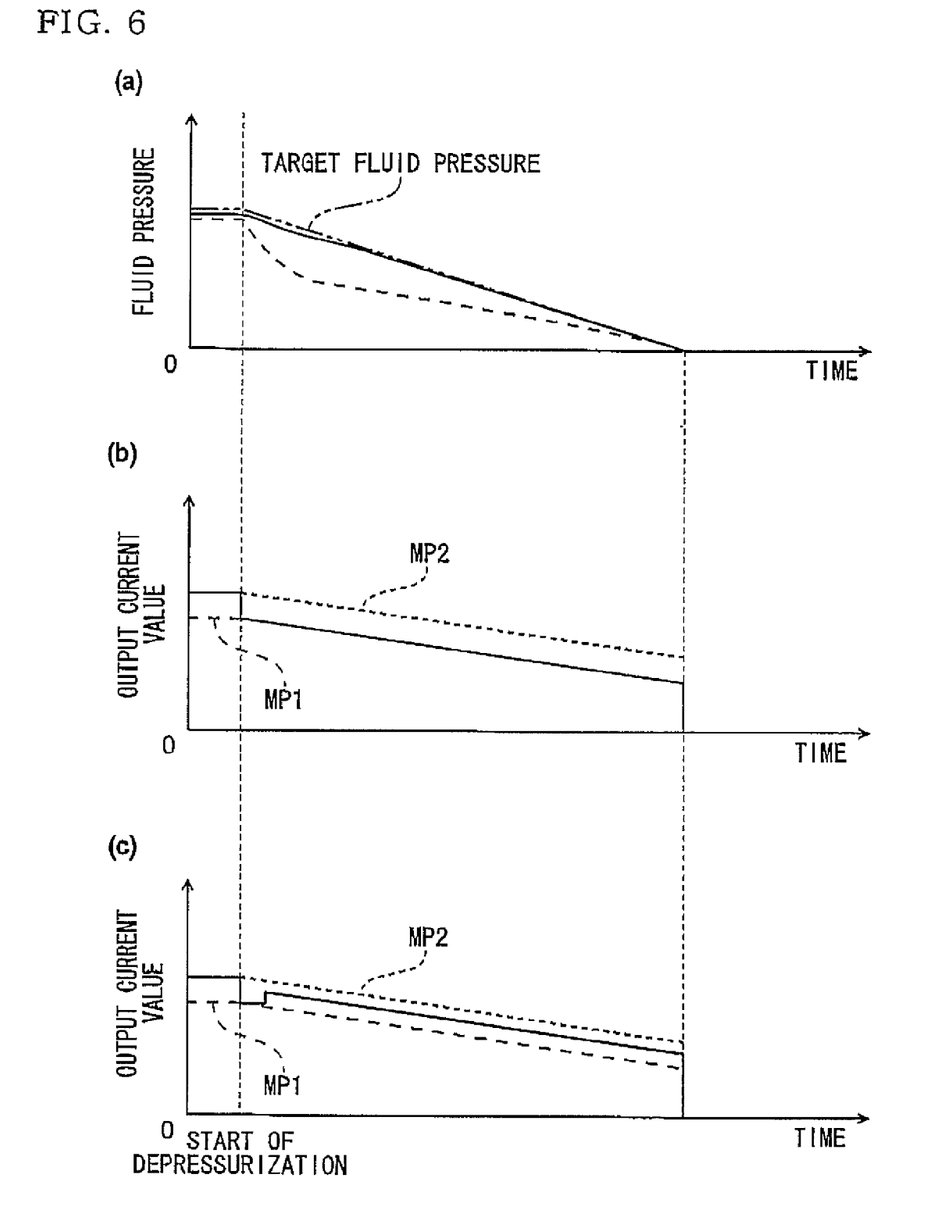
FIG. 6(a) is a graph showing a change with time in fluid pressure within a wheel brake.
FIG. 6(b) is a graph showing a change with time in an output current value when a current value switching control is not executed.
FIG. 6(c) is graph showing a change with time in an output current value when the current value switching control is executed.

Next, referring to FIG. 6, a change in fluid pressure within the wheel brakes when the current value switching control is executed through a comparison with a case where no such current value switching control is performed. Here, the control in which no current value switching control is executed is referred to as a control in which a simple shifting from the valve closing map MP2 to the valve opening map MP1 is carried out, as is shown in FIG. 6(b).

As is shown in FIG. 6(a), in a case where the fluid pressures within the wheel brakes are attempted to be reduced moderately along a target fluid pressure which has a moderate gradient as is indicated by a chain double-dashed line, when a control shown in FIG. 6(b) is performed, the fluid pressures within the wheel brakes drop drastically as is indicated by a broken line in FIG. 6(a). In contrast to this, when a current value switching control shown in FIG. 6(c) is performed, since the output current value to the pressure regulator valves R is changed to the intermediate current value after it has once been changed to the output current value of the valve opening map MP1, the opening amount of the pressure regulator valves R is reduced well after the opening of the pressure regulator valves R has been ensured. Because of this, in a control shown in FIG. 6(b) in which the output current value of the valve closing map MP2 is directly changed to the output current value of the valve opening map MP1, the pressure regulator valves R are opened excessively, whereby the fluid pressure reduction amount becomes too large. In contrast to this, according to the current value switching control shown in FIG. 6(c), since the opening amount of the pressure regulator valves R is reduced to the amount which corresponds to the intermediate current value, there is caused no fear that the fluid pressures within the wheel brakes drop drastically as indicated by a solid line in FIG. 6(a). Thus, the fluid pressures within the wheel brakes are reduced gradually along a target fluid pressure.

Thus, according to the embodiment of the invention that has been described heretofore, the following advantages can be obtained.

Even in the event that the valve closing property and the valve opening property of the pressure regulator valves R differ largely from each other, the good fluid pressure reduction can be realized by executing the current value switching control, thereby making it possible to minimize the influences by the property difference resulting from the construction and setting of assemblage of the pressure regulator valves R.

Since the current value switching control is executed in the automatic pressurizing control which is performed while the vehicle is driving, a control to reduce gradually the fluid pressures within the wheel brakes while the vehicle is driving at high speeds, for example, can be executed with high accuracy, thereby making it possible to allow the driver to feel a stabler braking feeling when he or she drives the vehicle at high speeds.

The invention is not limited to the embodiment that has been described above and hence can be applied in various forms as will be described below.

In the embodiment, while the invention is described as being applied to the control that is performed after the automatic braking during the cruise control, the invention is not limited thereto. The invention may be applied to, for example, a control that is performed after the automatic pressurizing control in the braking assist, a control that is performed after the brake fluid pressures holding control in the hill start assist (a control which assists in hill start) or a control that is performed after the brake fluid pressures holding control in a creeping aid system (a control for smooth restart after the engine is stopped due to idling). In particular, the invention is preferably applied to the hill start assist or the creeping aid system in which the fluid pressures of the wheel brakes which were increased before the start of the vehicle or are held as they were are reduced at the time of start of the vehicle.

Namely, in the current value switching control according to the invention, after the pressure regulator valves are once opened, the pressure regulator valves can be controlled using the intermediate current value lying somewhere between the valve closing and opening maps so as to reduce the fluid pressures within the wheel brakes gradually. Therefore, the pressure regulator valves do not have to be opened and closed a plurality of times, and thus, the fluid pressures within the wheel brakes can be reduced quietly. Because of this, even in the case of the engine speed being relatively low as when the vehicle is about to start (for example, as when the hill start assist control is carried out), the pulsation and operating noise resulting from the opening or closing of the pressure regulator valves can be suppressed, thereby making it possible to prevent the driver from being caused to feel an uncomfortable sensation.

Figure 7A:
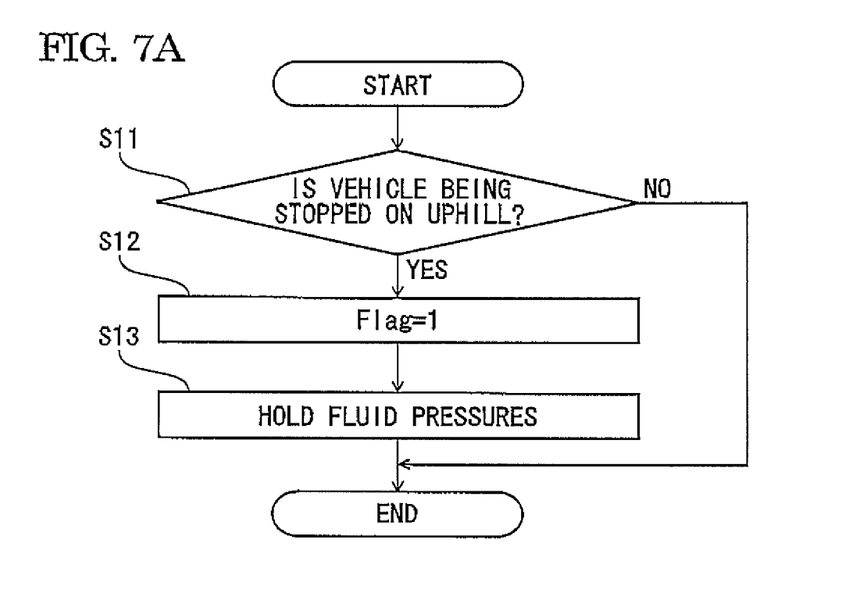
FIG. 7A is a flowchart showing a hill start assist control.
Figure 7B:
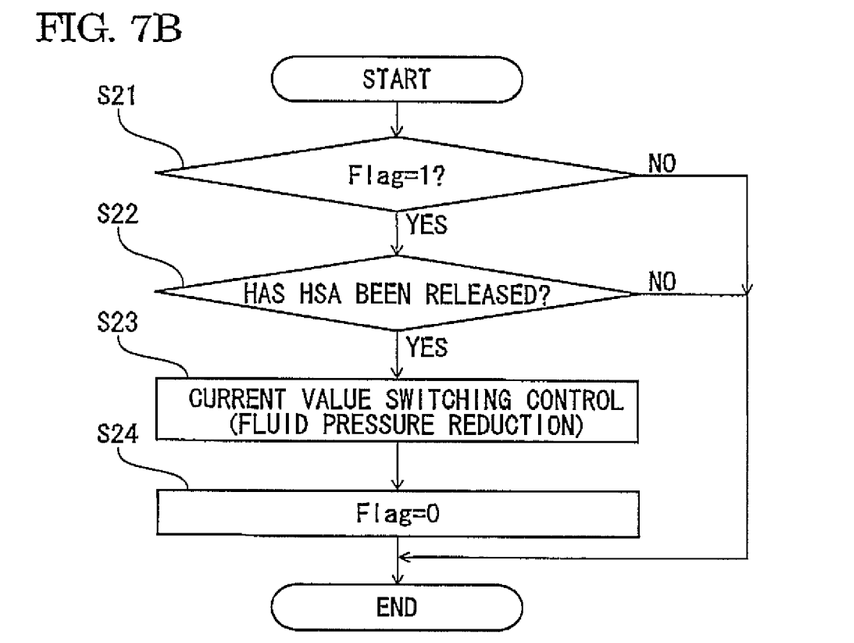
FIG. 7B is a flowchart showing a fluid pressures reducing control after the hill start assist control is released.

As an example of a hill start assist control, controls may only have to be carried out according to flowcharts shown in FIGS. 7A, 7B.

Namely, as is shown in FIG. 7A, the control unit determines at all times whether or not the vehicle has stopped on an uphill based on signals from the wheel speed sensors or an acceleration sensor (S11). In step S11, if the control unit determines that the vehicle has stopped on an uphill (Yes), the control unit assigns "1" to a Flag which indicates that a hill start assist control has been started (S12). Thereafter, after the brake pedal is released, the control unit executes a known holding control in which the fluid pressures generated by the brake pedal being depressed are held (S13) and ends this control. Here, as the holding control, a control may only have to be carried out in which both the pressure regulator valves R and the suction valves 7 are closed.

On the other hand, a control shown in FIG. 7B is carried out in parallel to the hill start assist control shown in FIG. 7A. In the control shown in FIG. 76, the control unit determines whether or not the hill assist control has been carried out by determining whether or not the Flag indicates "1" (S21). If it determines that the Flag indicates "1" in step S21, the control unit then determines whether or not the hill start assist (HAS) control has been released (S22). Here, in order to determine whether or not the hill start assist control has been released, a method may be adopted in which for example, a sensor for detecting a depression of an accelerator pedal is provided, so that whether or not the accelerator pedal has been depressed is determined based on a signal from the sensor.

If it is determined in step S22 that the hill start assist control is released (Yes), the control unit executes a current value switching control similar to the embodiment described above (S23), returns the Flag to "0" (S24) and ends this control. According to this configuration, the invention can be applied to the event that the fluid pressures within the wheel brakes are reduced while the brake fluid pressures are being increased in the hill start assist control (in steps S11 to S13) or while the brake fluid pressures are being held (step S13 onwards). Because of this, the pulsation and operating noise due to the opening or closing of the pressure regulators can be suppressed, thereby making it possible to realize a good hill start without causing the driver to feel an uncomfortable sensation.

What is claimed is:

1. A vehicle brake fluid pressure control apparatus comprising:
    a pump configured to pressurize a brake fluid so as to increase a fluid pressure within a wheel brake;
    a pressure regulator valve configured to adjust the fluid pressure within the wheel brake, the pressure regulator valve comprises a normally open electromagnetic valve which is configured to adjust a differential pressure between an upstream side and a downstream side of the pressure regulator valve in accordance with a current value; and
    a control unit configured to control a current which is caused to flow to the pressure regulator valve, the control unit including:
        a memory part configured to store a valve closing map which shows a relationship between the differential pressure between the upstream side and the downstream side of the pressure regulator valve and an output current value for closing the pressure regulator valve and a valve opening map which shows a relationship between the differential pressure and an output current value for opening the pressure regulator valve, wherein
        when attempting to reduce the fluid pressures within the wheel brakes by opening the pressure regulator valve, the control unit executes a current value switching control in which the current that flows to the pressure regulator valve is controlled so that the output current value of the valve closing map is changed to the output current value of the valve opening map and thereafter, the output current of the valve opening map is changed to an output current value which lies somewhere between the output current value of the valve closing map and the output current value of the valve opening map.

2. The vehicle brake fluid pressure control apparatus according to claim 1, wherein
    the current value switching control is executed when attempting to reduce the fluid pressures of the wheel brakes which were increased before the start of the vehicle or are held as they were at the time of start of the vehicle.

3. The vehicle brake fluid pressure control apparatus according to claim 1, wherein
    the current value switching control is executed when attempting to reduce the fluid pressures of the wheel brakes which were increased before a start of the vehicle or are held as they were at the time of start of the vehicle.

4. The vehicle brake fluid pressure control apparatus according to claim 1, wherein
    the control unit controls opening and closing operations of the pressure regulator valve based on signals inputted from pedal sensor, inter-vehicle distance sensor, wheel speed sensors and cruise control selector switch, so as to control the operation of the wheel brakes.

5. The vehicle brake fluid pressure control apparatus according to claim 4, wherein
    the control unit is made up of an automatic braking control part, a motor driving part, a valve driving part and a memory part,
    the automatic braking control part executes an automatic pressurizing control in which the brake fluid is pressurized by the pump to increase the fluid pressures in the wheel brakes when an inter-vehicle distance between a preceding vehicle and subject vehicle becomes a predetermined value or smaller, and
    the automatic braking control part executes an automatic reducing control after automatic pressurizing control ends.

6. The vehicle brake fluid pressure control apparatus according to claim 5, wherein
    the automatic braking control part executes the automatic braking control on condition that no signal is received from the pedal sensor and the cruise control selector switch is on.

7. The vehicle brake fluid pressure control apparatus according to claim 6, wherein
    in the automatic braking control, the automatic braking control part calculates an inter-vehicle distance based on signals which are outputted from the inter-vehicle distance sensor and determines whether or not the inter-vehicle distance becomes a predetermined value or smaller at all times.

8. The vehicle brake fluid pressure control apparatus according to claim 7, wherein
    when the inter-vehicle distance becomes the predetermined value or smaller, the automatic braking control part controls the pump to pressurize the brake fluid to increase the fluid pressures within the wheel brakes so as to allow the subject vehicle to be spaced farther away from the preceding vehicle.

9. The vehicle brake fluid pressure control apparatus according to claim 7, wherein
    when the inter-vehicle distance is restored to a sufficient level as a result of when the inter-vehicle distance becomes larger than a secondary target value L2, the automatic braking control part ends the automatic pressurizing control and executes the automatic reducing control.

10. The vehicle brake fluid pressure control apparatus according to claim 5, wherein
    when reducing the pressurized brake fluid to reduce the fluid pressures within the wheel brakes which have been increased by the pump by opening the pressure regulator valve, the automatic braking control part executes the current value switching control.

11. The vehicle brake fluid pressure control apparatus according to claim 5, wherein
    the valve driving part controls the pressure regulator valve based on an indication given by the automatic braking control part, and when an indication of the output current value is given by the automatic braking control part, a suction valve driving part outputs signals to a suction valve and the suction valve is opened, whereby brake fluid is sucked into the pump from a master cylinder.

12. The vehicle brake fluid pressure control apparatus according to claim 5, wherein
when a driving current is supplied to the pressure regulator valve, a differential pressure corresponding to the driving current given is formed between the upstream side and the downstream side of the pressure regulator valve, and
in case a differential pressure is larger than one corresponding to the driving current is generated, the pressure regulator valve is opened so as to maintain the differential pressure corresponding to the driving current.

13. The vehicle brake fluid pressure control apparatus according to claim 1, wherein
in the valve opening map and the valve closing map, for a same differential pressure, an output current value (D2) which is calculated based on the valve closing map is made to take a larger value than an output current value (D1) calculated based on the valve opening map.

14. The vehicle brake fluid pressure control apparatus according to claim 1, wherein
the control unit determines at all times whether or not the vehicle has stopped on an uphill based on signals from wheel speed sensors or an acceleration sensor,
if the control unit determines that the vehicle has stopped on an uphill, the control unit assigns a first value which indicates that a hill start assist control has been started,
after a brake pedal is released, the control unit executes a holding control, in which the fluid pressures are held,
if the control units determines an indication of the first value, the control unit then determines whether or not a hill start assist (HAS) control has been released,
if it is determined that the hill start assist control is released, the control unit executes the current value switching control.

15. The vehicle brake fluid pressure control apparatus according to claim 1,
wherein, in the current value switching control, the output current value of the valve closing map is changed to the output current value of the valve opening map and thereafter, the output current of the valve opening map is once changed to the output current value lying therebetween.

* * * * *